Dec. 10, 1940.     H. G. DAVIS     2,224,672
COFFEE MAKER
Filed July 24, 1939     2 Sheets-Sheet 1
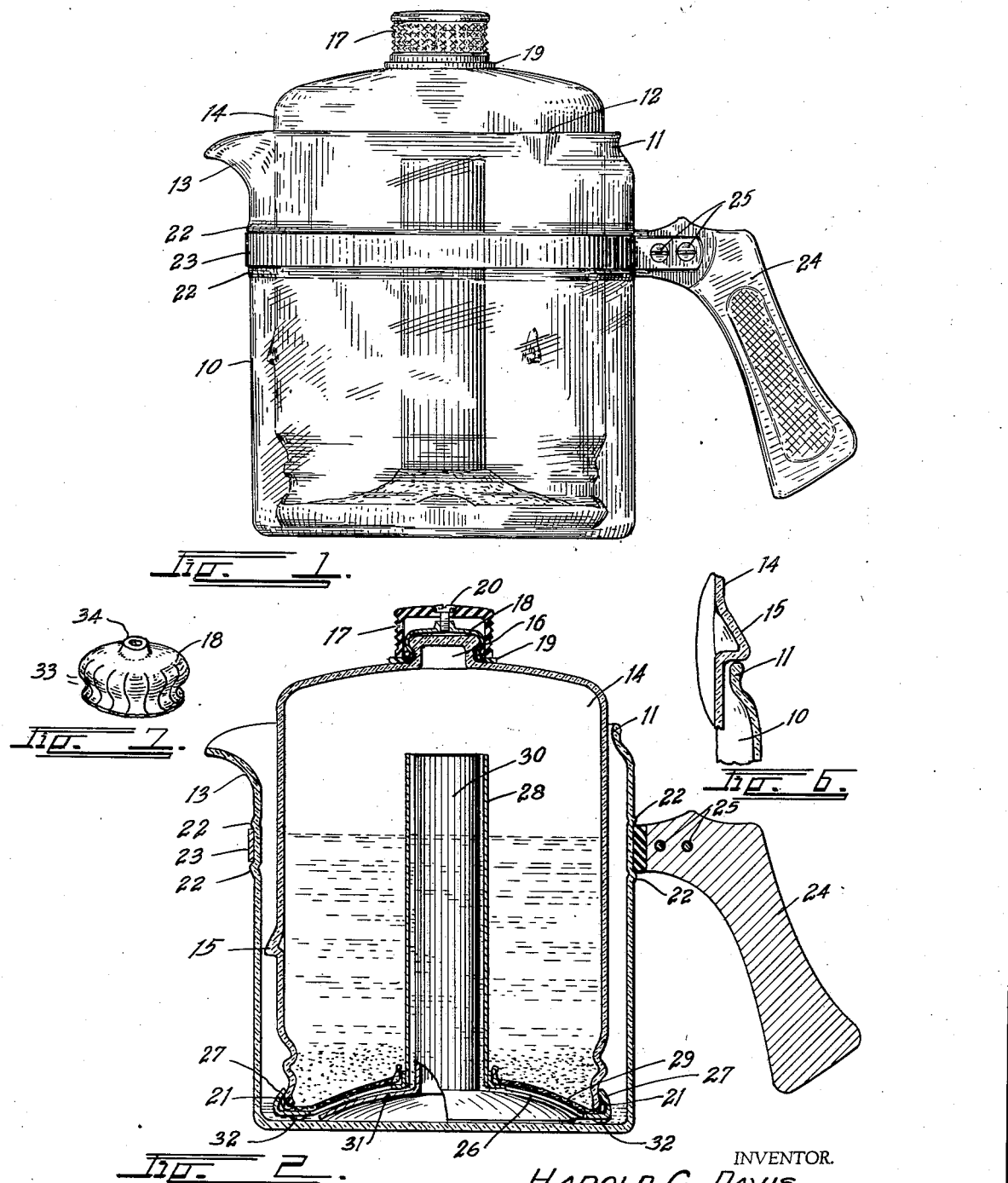
INVENTOR.
HAROLD G. DAVIS.
BY
ATTORNEY.

Dec. 10, 1940.       H. G. DAVIS       2,224,672
COFFEE MAKER
Filed July 24, 1939      2 Sheets-Sheet 2
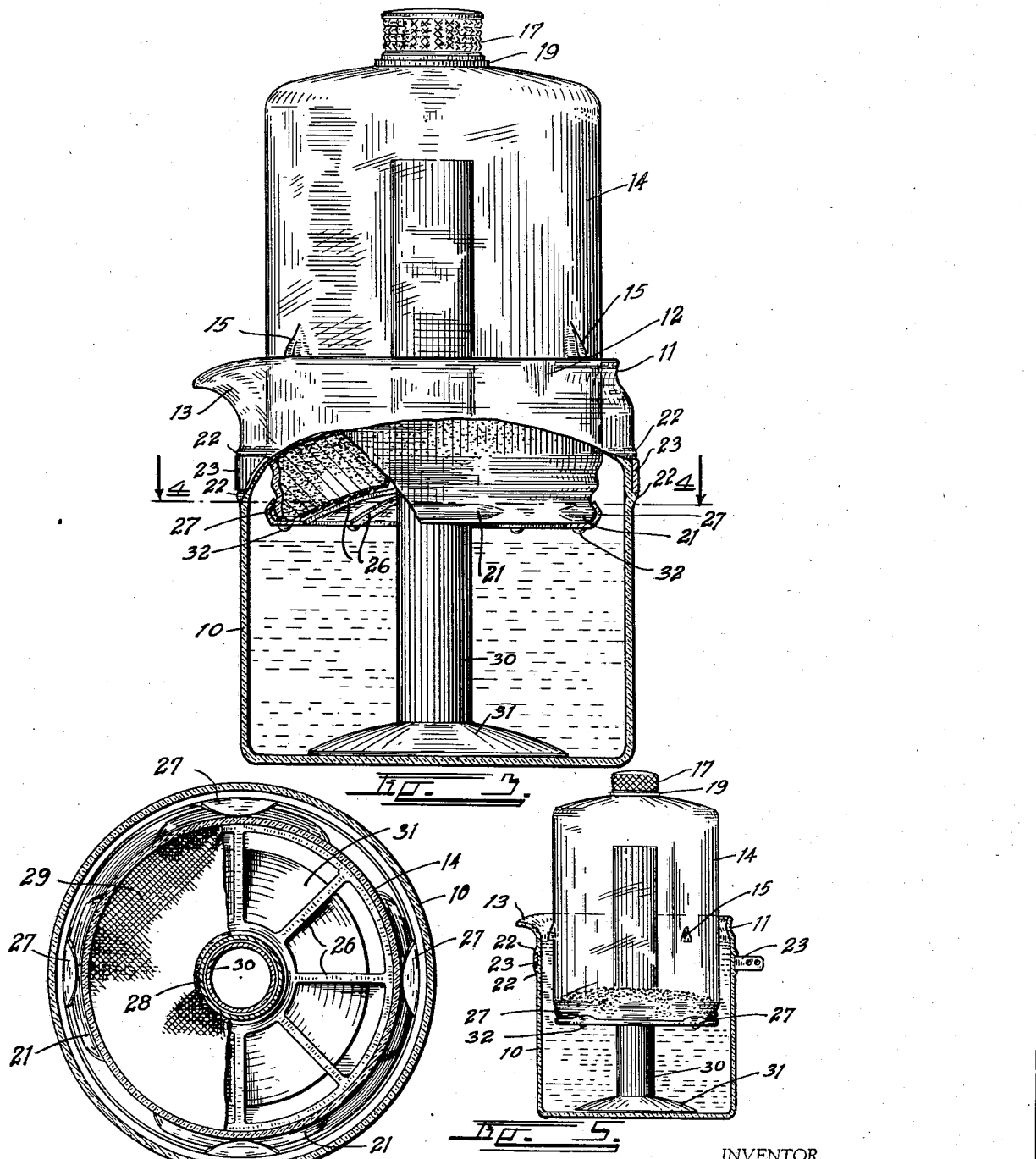
INVENTOR.
HAROLD G. DAVIS.
BY
ATTORNEY.

Patented Dec. 10, 1940

2,224,672

UNITED STATES PATENT OFFICE 2,224,672

COFFEE MAKER

Harold G. Davis, Denver, Colo.

Application July 24, 1939, Serial No. 286,221

7 Claims. (Cl. 53—3)

This invention relates to a coffee maker and is more particularly designed as an improvement on the types of coffee makers shown in applicant's prior Patents Nos. 2,152,792 and 2,079,602.

The principal object of this invention is to provide a coffee maker in which it will be impossible for any vapor or aroma to escape from the time brewing starts until the coffee reaches the cup; in which the ground coffee will not be subjected to boiling; in which a complete and thorough brewing action will be obtained; and in which the final coffee will be free from grounds.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a side elevation of the assembled coffee maker.

Fig. 2 is a vertical section through the coffee maker, in the position of Fig. 1, as it would appear when the brewing is completed and the coffee is ready for pouring.

Fig. 3 is a side elevation partially broken away illustrating the coffee maker in the preliminary position for bringing the water to the boiling point.

Fig. 4 is a fragmentary horizontal cross section therethrough, taken on the line 4—4, Fig. 3.

Fig. 5 is a small scale side elevation, partially in section, illustrating the coffee maker in an intermediate position.

Fig. 6 is an enlarged detail section through the upper edge of the outer container illustrating a lug of the inner container resting thereon.

Fig. 7 is a detail perspective view of the metal cap for holding the composition finger knob in place.

The improved coffee maker comprises an open topped outer container 10, preferably but not necessarily of "pyrex" or other heat resisting glass. The upper edge of the outer container 10 is turned inwardly to form a slightly restricted neck portion 11. Two vertical passageways 12 extend downwardly through the restricted neck portion and a spout 13 is also formed therein.

The container 10 is formed with two circumferential, spaced-apart beads 22 for holding a handle band 23 in place thereon. The extremities of the handle band are secured to a suitable handle 24 by means of clamp screws 25 which clamp the band 23 snugly around the container 10.

An open bottomed inner container 14, also preferably of glass, fits telescopically into the outer container 10. The inner container 14 is formed with three projecting lugs 15 which normally support the inner container above the outer container, as shown in Fig. 3. When the inner container is turned to a certain position these three lugs align with the two passages 12 and the spout 13 so that they can pass downwardly through the restricted portion 11 to the position shown in Figs. 1, 2, and 5. The containers 10 and 14 are imperforate.

The closed top of the inner container 14 is formed with a bulbous projection 16 for the attachment of a finger knob 17 of "bakelite" or similar non-metallic material. The knob is attached by means of a resilient metal clamping cap 18, the skirt of which is split at a plurality of points, as shown at 33, so that it can expand to snap into place and into gripping engagement about the projection 16. The knob 17 is placed over the cap 18 resting against a resilient gasket 19. A screw 20 is then threaded through the knob 17, into an internally threaded boss 34 on the cap 18, to pull the knob securely against the gasket 19. After the knob 17 is in place, the cap cannot be pulled from the projection 16 since the knob fits sufficiently close to prevent expansion of the cap.

The bottom of the inner container 14 is slightly reduced in diameter and is formed with a series of projecting, inclined thread lugs 21. In the construction illustrated, four of the inclined lugs are employed.

A convex spider member 26 is detachably secured across the open bottom of the container 14. The spider member is formed with a peripheral band from which four hooked members 27 project. The hook members 27 correspond in number and position to the thread lugs 21 and, when the spider member is rotated, these hooks slide upwardly over the lugs to clamp the spider member tightly against the bottom edge of the container 14.

The spider member supports an outer tube 28 which extends axially upwardly into the inner container 14. An annular filter medium 29 is clamped between the lower edge of the inner container and the spider member 26 and rests upon the latter to close the bottom of the container 14.

Any suitable material may be used for the filter medium 29. It has been found that a rough surface, porous fabric, such as turkish toweling, is admirably adapted for this purpose since it prevents surface washing action when pouring and holds the coffee grounds uniformly distributed thereover so that the grounds themselves serve as a filter bed.

A percolater tube 30 having a bell-shaped bottom 31 rests upon the bottom of the outer container 10. The tube 30 is of smaller diameter than the tube 28 and extends upwardly therein leaving an open passage between the two tubes. The bell-shaped bottom 31 is received in the concave spider member 26 when the assembly is in the position of Fig. 2. A series of knobs 32 project downward from the spider member so as to support the latter above the bottom of the container 10 when in the position of Fig. 2.

*Operation*

The water is placed in the outer container 10 and the inner container 14 is held on its side and the ground coffee is placed therein. The spider 26 carrying the filter medium 29 is screwed tightly against the bottom of the inner container 14. The percolator tube 30 is placed in the container 10 with its bell-shaped bottom 31 resting on the bottom thereof. The lower extremity of the inner container 14 is now placed in the outer container 10, as illustrated in Fig. 3 with the lugs 15 supporting it above the water line therein. The complete assembly is then placed on a stove or other heating device and the water in the container 10 is brought to the boiling point.

The heat at the bottom of the percolator tube forces hot vapor and steam up the tube 30 into the inner container 14 thereby filling the interior with hot, expanded vapor or steam to exhaust the air therefrom. Any bubbling water overflowing the percolator tube flows downwardly between the two tubes into the water in the container 10 so that the ground coffee remains dry. This action creates a slight pressure in the container 14 to force the cool air downwardly through the ground coffee and through the filter 29 and discharging it above the water in the container 10.

The complete assembly is now removed from the fire, the inner container 14 is rotated to align the lugs 15 with the passages 12 and the spout 13, and it is lowered onto the surface of the water in the container 10, as shown in Fig. 5. The inner container temporarily floats in this position until a reduction in pressure occurs therein, due to the lowering temperature of the water. The cooling of any air remaining in the inner container and the condensation of the steam and vapor therein creates a partial vacuum which draws the water from the outer container 10 upwardly through the filter and through the ground coffee into the inner container 14. The latter gradually descends as it fills until it reaches the position of Fig. 2 at which time the vacuum will continue to draw the water from the outer container until it is all completely within the inner container, as shown in Fig. 2.

When the outer container 10 has been exhausted of water, air passes between the filter material 29 and the bell-shaped bottom 31 and bubbles upwardly through the water between the tubes 28 and 30. As these bubbles approach the surface, they expand violently and suddenly to throw spurts of water from the tops of the tubes similar to the well-known percolating action. This percolating action continues at intermittent intervals as long as there is sufficient heat present and causes a definite circulation and brewing action downwardly through the ground coffee and upwardly between the tubes so as to extract the maximum strength therefrom.

The coffee remains in the inner container until ready for use. It is poured into the coffee cup from the position of Fig. 2. When the containers are tilted for pouring, air enters the inner container through the upper side of the space between the tubes 28 and 30 to displace the coffee which flows downwardly through the grounds and filter medium, between the spider member 26 and the bell-shaped bottom 31, into the outer container 10 and from the spout 13 thereof.

The bell-shaped bottom 31 serves to separate a portion of the water over the hot spot in the bottom from the remainder of the water so that this water will reach boiling temperature in advance of the remainder of the water so as to increase the speed of evacuation from the inner container 14.

The lugs 15 cooperate with the in-turned upper edge 11 of the outer container to form guide members to maintain the inner container vertical and to prevent tilting or cramping thereof.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A coffee maker comprising: an open topped outer water container; an open bottomed inner container vertically movable in said outer container, said containers being hermetically sealed except for their respective open top and bottom; a filter support detachably secured across the bottom of said inner container; a filter medium supported by said filter support; and a percolating tube extending upward from the bottom of said outer container through said filter support and through said filter medium and terminating within said inner container.

2. A coffee maker comprising: an open topped outer water container; an open bottomed inner container vertically movable in said outer container, said containers being hermetically sealed except for their respective open top and bottom; a filter support detachably secured across the bottom of said inner container; a filter medium supported by said filter support; a percolating tube extending upward from the bottom of said outer container through said filter support and through said filter medium and terminating within said inner container; and releasable means for supporting the inner container above the water line in said outer container until released.

3. A coffee maker comprising: an open topped outer water container; an open bottomed inner container vertically movable in said outer container, said containers being hermetically sealed except for their respective open top and bottom; a filter support detachably secured across the bottom of said inner container; a filter medium supported by said filter support; a percolating tube extending upward from the bottom of said outer container through said filter support and through said filter medium and terminating within said inner container; and an outer tube extending upward from said filter support into said inner container about said percolating tube.

4. A coffee maker comprising: an open topped outer water container; an open bottomed inner container vertically movable in said outer container, said containers being hermetically sealed except for their respective open top and bottom; a filter support detachably secured across the bottom of said inner container; a filter medium supported by said filter support; a percolating tube extending upward from the bottom of said outer container through said filter support and through said filter medium and terminating within said inner container; an outer tube extending upward from said filter support into said inner container about said percolating tube; and releasable means for supporting the inner container above the water line in the outer container until released.

5. A coffee maker comprising: an open topped outer water container; an open bottomed inner container vertically movable in said outer container, said containers being hermetically sealed except for their respective open top and bottom; a filter support detachably secured across the bottom of said inner container; a filter medium supported by said filter support; a fixed outer tube extending axially upward in said inner container from said filter support; and a loose percolator tube having a belled-bottom resting on the bottom of said outer container and extending upward past said filter medium and terminating within said outer tube.

6. A coffee maker comprising: an open topped outer water container; an open bottomed inner container vertically movable in said outer container, said containers being hermetically sealed except for their respective open top and bottom; a filter support detachably secured across the bottom of said inner container; a filter medium supported by said filter support; a fixed outer tube extending axially upward in said inner container from said filter support; a loose percolator tube having a belled-bottom resting on the bottom of said outer container and extending upward past said filter medium and terminating within said outer tube; and releasable means for supporting the bottom of said inner container above the water line in said outer container until released.

7. A coffee maker comprising: an outer water container having an inwardly extending upper peripheral edge; an open-bottomed inner container vertically movable within the confines of said edge; lugs projecting from said inner container and resting on said edge to support the lower edge of the inner container above the water line in the outer container; there being vertical passageways through said edge for said lugs to allow the inner container to be lowered into the outer container when desired; a spider member detachably secured across the bottom of the inner container; an axially positioned outer tube extending upward from the spider member into the inner container; a filter medium supported by the spider and closing the bottom of the inner container about said tube; a bell-shaped member resting on the bottom of said outer container; and a percolator tube extending upwardly through said bell-shaped member and terminating within said outer tube.

HAROLD G. DAVIS.